United States Patent [19]

Young

[11] 4,066,980
[45] Jan. 3, 1978

[54] THIN FILM EXCITATION

[76] Inventor: Robert A. Young, R.R. No 2, Loretto, Canada

[21] Appl. No.: 594,356

[22] Filed: July 9, 1975

[51] Int. Cl.² .............................................. H01S 3/05
[52] U.S. Cl. ................................ 331/94.5 G; 356/202
[58] Field of Search .................... 331/94.5, 94.5 G; 330/4.3; 356/85, 201, 202, 209

[56] References Cited

U.S. PATENT DOCUMENTS 3,617,804  11/1971  Libby et al. ..................... 331/94.5 X

OTHER PUBLICATIONS

L'vov, Atomic Absorption Spectrchemical Analysis, pub. by Adam Hilger (London), 1970, pp. 253–263.
Lisitsyn et al., Optics and Spectroscopy, vol. 27, No. 2, Aug. 1969, pp. 157–61.

*Primary Examiner*—John S. Heyman
*Attorney, Agent, or Firm*—John E. Benoit

[57] ABSTRACT

A device to produce and test a thin film of excited gas or liquid comprising a helium resonance lamp having an emission at 584A and including a window in said lamp partially transparent to radiation at 584A. A chamber containing a gas mixture including helium surrounds the window. Windows are provided in the chamber adjacent the lamp window, said windows being transparent to emission emanating from the gas adjacent the lamp window when the lamp is excited by an RF source.

6 Claims, 5 Drawing Figures

THIN FILM EXCITATION

The present invention relates generally to the excitation of thin films and more particularly to such excitation using a rare gas resonance lamp.

Because lasers only require that stimulated emission occurs along the path taken by a photon, lasers may have dimensions perpendicular to the propagation directions as small as a few wavelengths of the laser radiation. This means that present known lasers will continue to function as the dimensions are reduced to that of a thin film or narrow filament provided that the excited state inversion is not altered.

A necessary condition for the use of thin films of gases or liquids as laser mediums is that they be excited. The creation of excited state inversion requires the deposition of energy. Generally, the known means for accomplishing such deposition do not localize the energy deposition and, hence, produce regions of inversion which are thick perpendicular to the laser propagation direction. Although this may increase the power output of the laser, it does not increase its linear gain or threshold requirements.

When great energy deposition rates per unit length along the laser propagation direction are required (for example when a tunable laser is desired) very large total energy deposition is required for thick lasers making it difficult to control gas temperature and composition while requiring large, elaborate and expensive excitation apparatus.

The present invention greatly diminishes the cost, size and weight, of the excitation source and should the excited gas or liquid be a suitable laser component these advantages will characterize the laser itself.

This invention confines means of depositing energy so that it occurs in a thin region.

Accordingly, it is an object of the present invention to provide a thin film of excited gases or liquids.

Another object of this invention is to provide a thin film of excited gases or liquids using a rare gas resonance lamp.

These and other objects of the invention will be clearly understood from the following description taken together with the drawings wherein.

Broadly speaking, the present invention provides a thin film of gas or liquid comprising a helium resonance lamp having an emission at 584A, for example. A chamber containing a gas mixture including helium surrounds the window. Windows are provided in the chamber adjacent the lamp window, said windows being transparent to emission emanating from the gas adjacent the lamp window when the lamp is excited by an RF source. Other rare gases could be used with appropraite window material.

Figure 1:
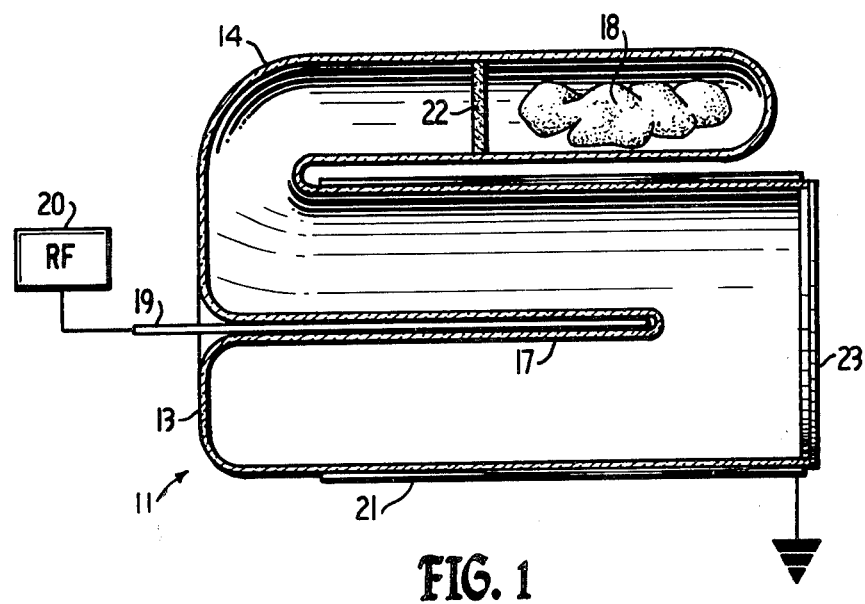
FIG. 1 is a schematic illustration of the helium resonance lamp used in the present invention.

Turning now to FIG. 1 there is shown therein a preferred embodiment of a helium resonance lamp used in the present invention. The basic structure of one embodiment of the lamp is described in U.S. Pat. No. 3,851,214 entitled Low Power Sealed Optically Thin Resonance Lamp and Patent Application entitled Resonance Lamp Having a Triatomic Gas Source filed Mar. 10, 1975 in the name of the present inventor. Other rare gas resonance lamps could also be used.

Basically, the lamp 11 comprises a hollow cylindrical body 13 having a dielectric wall such as glass, with a reentrant coaxial hollow glass element 17 located centrally within body 13. An electrical conductor 19 is connected to a source of RF energy 20. An integral arm 14 extends from cylindrical body 13 and contains a material 18 which acts as a getter such as uranium or barium. A gas permeable filter 22 such as glass frit maintains material 18 in position. Cylindrical body 13 is filled with high purity helium and a thin window 23, preferably of aluminum, is provided so as to pass only the desired radiation.

Window 23 is partially transparent to 584A radiation. The helium gas within cylindrical body 13 is maintained at a pressure between 0.1 and 100 torr.

Thus, there is provided a helium resonance lamp having an emission at substantially 584A with a thin, i.e. 1000A, window partially transparent to 584A radiation. The window 23 is designed so as to be able to withstand high pressure when immersed in a gas mixture such as a mixture wherein one of the components is helium at a pressure between 0.1 and 100 torr.

The cylindrical body may be covered by an electrically conductive material 21 which is electrically grounded as is schematically shown. An example of a means for accomplishing this is when cylindrical lamp body 13 is enclosed within a close fitting conductive housing which is grounded. Therefore, the lamp body is effectively sheathed by a grounded conductive element. This element completes the necessary path for electrical excitation by RF source 20.

When lamp 11 is electronically excited by the RF source 20, helium radiation is passed by the window and absorbed by He outside the lamp and, subsequently, this energy is transferred from the helium to other components of the gas mixture. This transfer may occur either directly, or through collisions of electrons, whose energy has been increased by superelastic interactions with excited helium or as a consequence of ion neutralization (either with a free electron or with an attached electron in the form of a negative ion).

Of those materials which pass 584A, aluminum is preferred for practical reasons.

Figure 2:
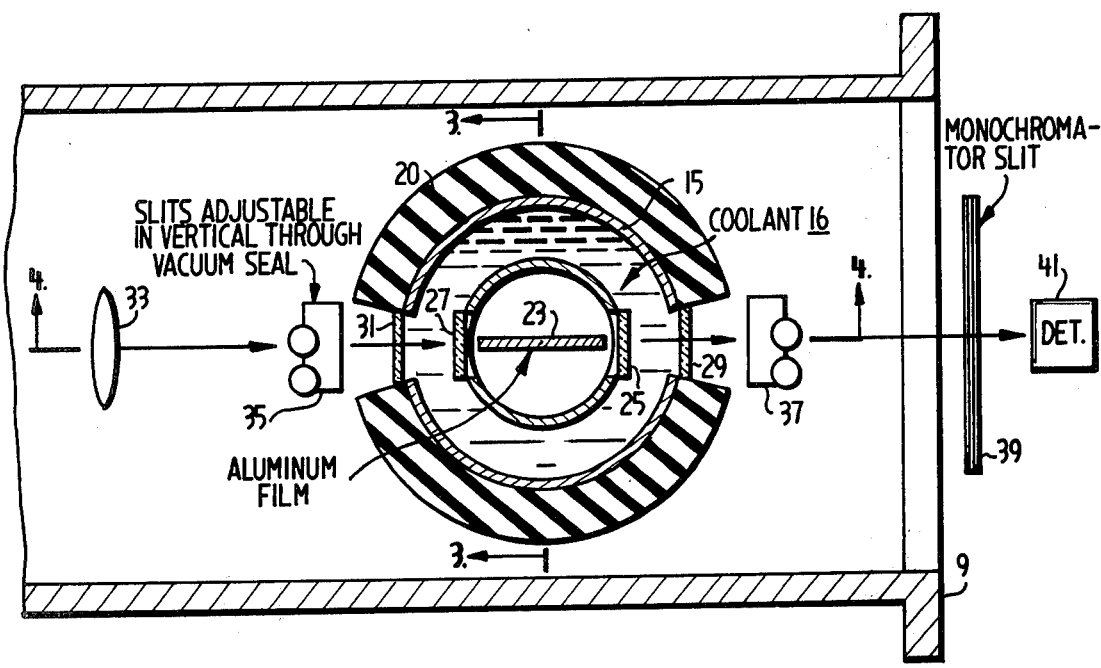
FIG. 2 is a schematic plan view of the excitation device of the present invention.
Figure 3:
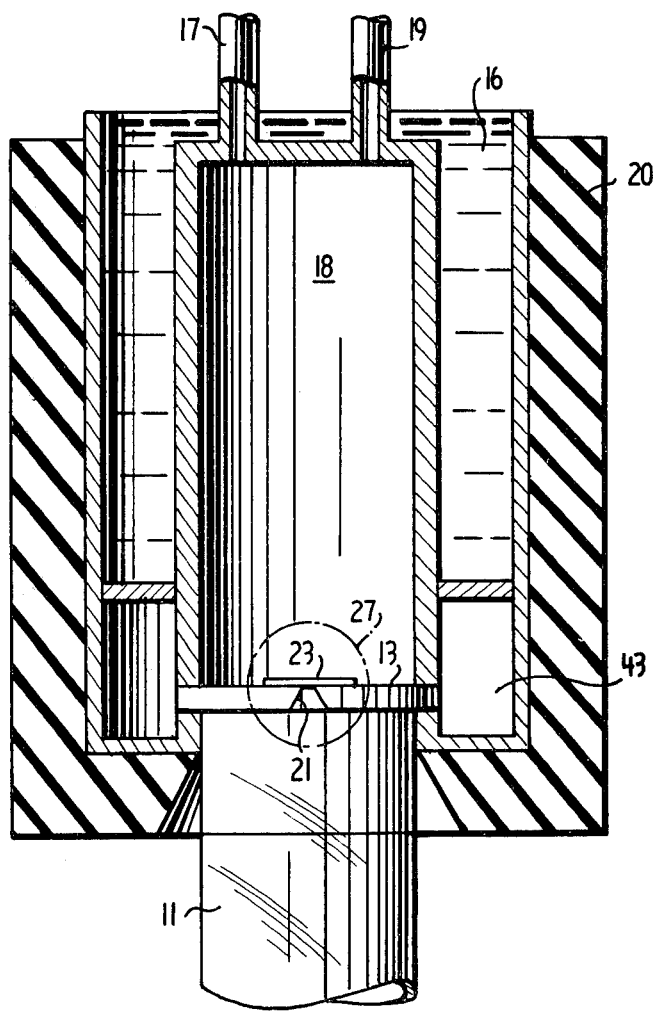
FIG. 3 is a schematic sectional view taken along the lines 3—3 of FIG. 2.
Figure 4:
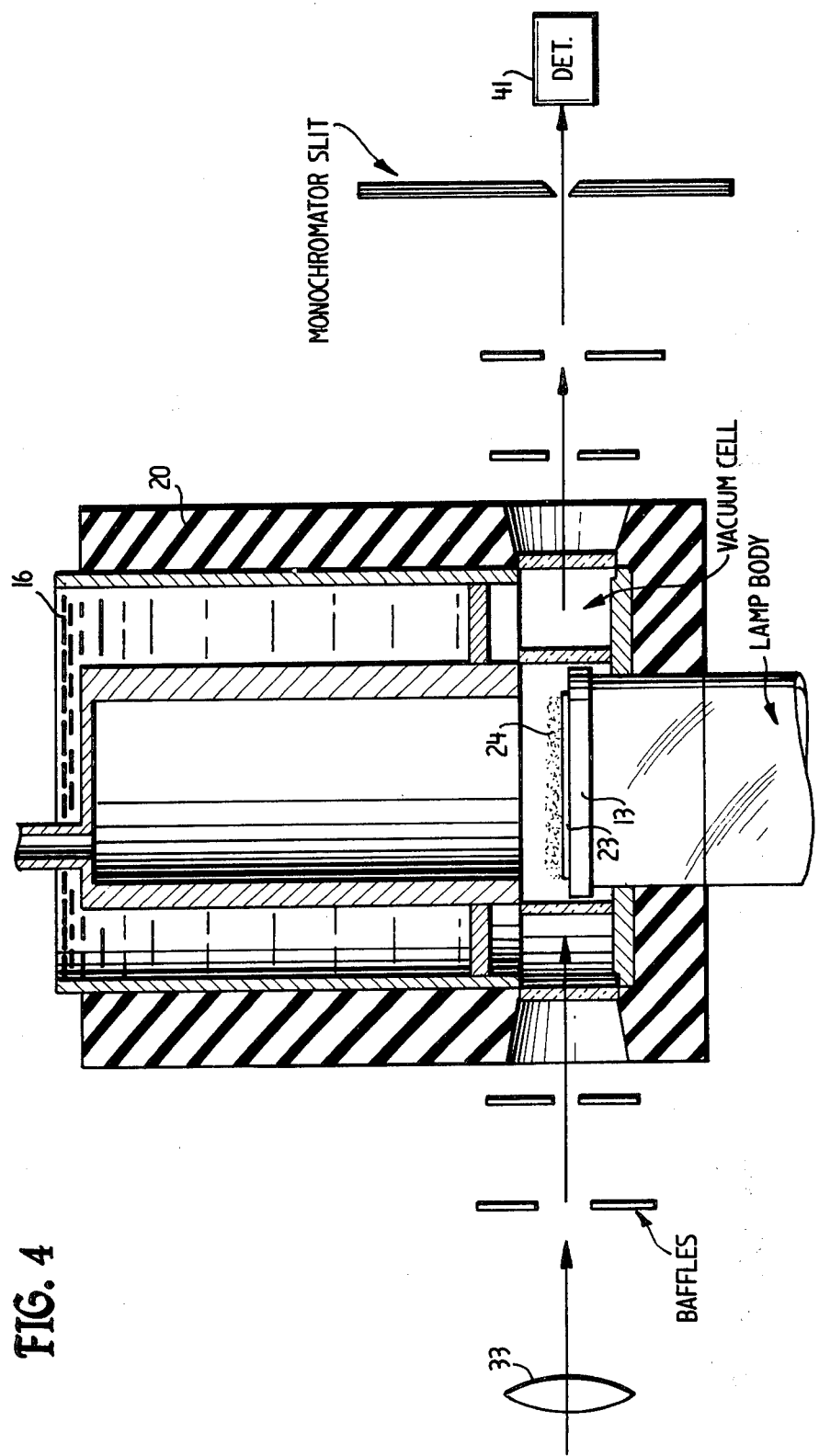
FIG. 4 is a schematic sectional view taken along the lines 4—4 of FIG. 2.

Turning now to FIGS. 2, 3, and 4 which will be discussed simultaneously, there is shown a general housing containing the excitation device of the present invention which includes a helium lamp 11 similar to that disclosed and described relative to FIG. 1. The lamp body, however, has a thermally conductive cap 13 covering one end in which is a milled slit 21 therein with the aluminum window 23 being secured thereon. The cap 13 comprises the base of a gas cell 18 contained within a thermally insulated high pressure gas chamber 15 having a coolant 16 between the outer portion of the chamber 15 and the gas cell.

The gas mixture is pumped into the gas cell 18 through a conduit 17 and outwardly through another conduit 19. The entire structure is surrounded with an insulation material 20 for maintaining proper temperatures. In order to provide an outlet for emission from the excited gas or liquid, the gas cell and chamber are provided with windows 25, 27, 29, and 31 as more clearly shown in FIG. 2 and also in FIG. 4. Adjustable slits 35 and 37 may be provided so as to provide the proper exit aperture for output or input to the excited gas or liquid. The lamp and the windows are maintained within a vacuum cell 43 with the windows not being covered by the insulation 20.

As indicated more specifically in FIG. 4 the excitation of the helium lamp causes 584A photons to penetrate the aluminum window. These photons are absorbed in a film of He contained in a gas or liquid mixture 24 adjacent to the aluminum window 23 of the lamp 11. In such an application, an extremely high energy deposition rate per cubic centimeter (between 1 and 100 watts/cm$^3$) and volume rate of ionization ($10^{19}$ to $10^{20}$ ion pairs/second cm$^3$) which is restricted to a film of gas approximately $10^{-4}$ centimeters thick adjacent to the helium resonance lamp aluminum windows 23 this energy is utilized to produce the excited gas or liquid of the present invention.

The use of a film of gas or liquid of the thickness described above represents tremendous advance in the art wherein this result otherwise requires very large energy inputs because energy deposition by other techniques cannot be limited to a film $10^{-4}$ centimeters in thickness. Hence the deposition of approximately 1 milliwatt of helium resonance energy in the film over the aluminum window is equivalent to 10 watts for each centimeter of thickness of other excitation devices.

The device of the present invention is not only a means to excite a thin film of gas or liquid but also a device of great utility in investigating the properties of this excited film to determine if the excited gas or liquid should be tested in full scale e-beam sustained discharges for laser devices or in full scale e-beam excitation laser devices.

A mixture of helium plus a gaseous material which results in the deposition of helium resonance energy over the aluminum window enters the gas cell inlet 17 through a valve (not shown) at a pressure from 0.1 to 100 atmospheres. Examples of such gaseous material are xenon, krypton, argon, neon, radon, mercury, and ammonia and mixtures thereof. Exemplary of suitable gas mixtures are helium plus zenon, kryton, neon or argon; helium plus xenon and krypton; helium plus xenon and argon; helium plus krypton and argon; helium plus mercury; and helium plus mercury and ammonia. Additionally, the cell may include other gases such as oxygen and chlorine in a mixture with the above gases.

The helium resonance energy is deposited in a thin (approximately $10^{-4}$ centimeters) film over the aluminum window 23 and above the milled slit 21 in lamp cap 13. As a result of this thin film 24, helium resonance energy may cause lasing to occur in a proper laser cavity in this film in the direction of the milled slit 21. Because this laser radiation may occur between 1000A and 100,000A, depending upon the internal energy transition of the gas being excited, windows with appropriate transmission characteristics are located in the projected laser beam and in the gas cell wall and in the isolation volume boundary with the provision that the thermal insulation does not cover the windows. The atmosphere within space 43 between the windows such as windows 27 and 31 and windows 25 and 29 must also have the appropraite optical transmission characteristics, and this is assured by either pumping all gas out of this region or by flushing it with the appropriate gas through a valve (not shown). Chamber 9 is needed if air absorbs either the test radiation projected through the excited film 24 on the radiation originating the excited film 24.

Windows 27 and 31 permit projection of optical radiation through the use of lens 33 through the excited film above the aluminum window for the purpose of measuring its attenuation or amplification.

Figure 5:
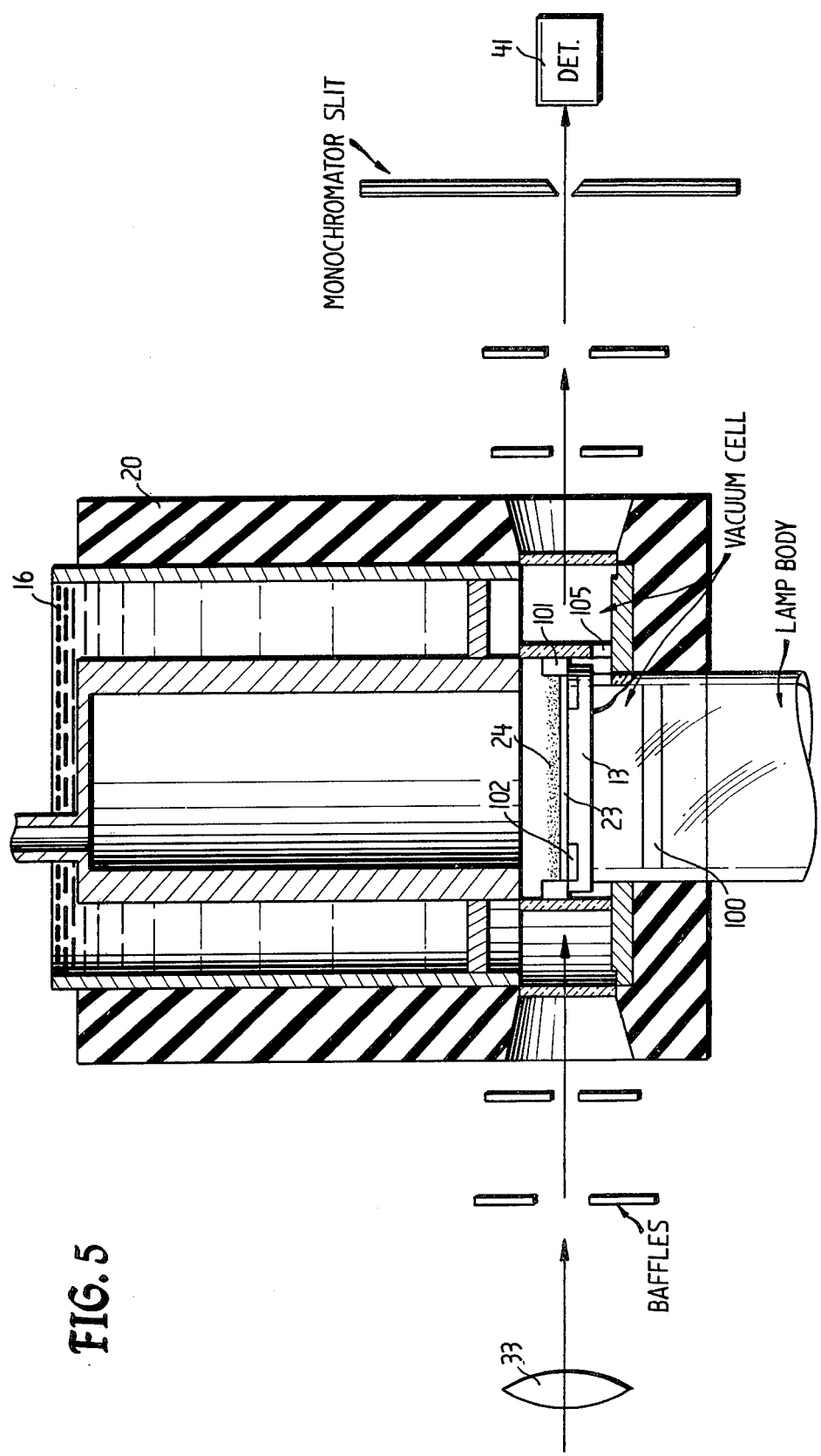
FIG. 5 is a modification of FIG. 4 showing apparatus suitable for testing for lasting action.

The device so far described can be modified as shown in FIG. 5 to separate the lamp window 100 from the energy absorption cell window 23 to interpose a vacuum region to the other vacuum cells by connection 105 and to add mirrors 101 to form a laser cavity inside the energy absorption cell, and to add acoustic transducers 102 to create surface waves on window 23 as disclosed in patent application entitled the Use of Surface Acoustic Waves to Tune a Thin Film Laser filed June 12, 1975 in the name of the present inventor.

The purpose of these modifications is to create different excited gas or liquid films on window 23, some of which may be a suitable lasing medium, which will be tested by using the laser cavity created by mirrors 101. If lasing does occur, the acoustic transducers 102 are used to create either standing or propagating surface wave on window 23 so as to tune the laser by the specially distributed laser medium gain induced by interaction of the surface wave with the thin excited gas or liquid film.

The above description and drawings are illustrative only since equivalents could be substituted without departing from the invention. Accordingly, the invention is to be limited only by the scope of the following claims.

I claim:
1. A device to produce and test a thin film of excited gas or liquid comprising
   a helium resonance lamp having an emission at 584A;
   an elongated window in said lamp of a material and design to be partially transparent to radiation at 584A;
   a chamber surrounding said elongated window;
   means for supplying a predetermined gas mixture containing helium to said chamber;
   further windows located in the wall of said chamber adjacent to and spaced from said elongated window, said windows being transparent to emission emanating from the gas adjacent to the elongated window; and
   the atmosphere in the space between said elongated window and said further windows having a predetermined optical transmission characteristic.
2. The device of claim 1 wherein said window is aluminum.
3. The device of claim 1 wherein said gas mixture contains helium in admixture with a gaseous material which results in the deposition of helium resonance energy over said window.
4. The device of claim 3 wherein said gaseous material is selected from a group consisting of xenon, krypton, argon, neon, radon, mercury and ammonia, and mixtures thereof.
5. The device of claim 4 wherein said gas mixture further contains oxygen.
6. The device of claim 4 wherein said gas mixture further contains chlorine.

* * * * *